United States Patent [19]

Lagier

[11] 4,068,209

[45] Jan. 10, 1978

[54] ELECTROACOUSTIC TRANSDUCER FOR DEEP SUBMERSION

[75] Inventor: Michel Lagier, Paris, France

[73] Assignee: Thomson-CSF, Paris, France

[21] Appl. No.: 628,838

[22] Filed: Nov. 4, 1975

[30] Foreign Application Priority Data

Nov. 8, 1974 France ................................ 74.37073

[51] Int. Cl.[2] .............................................. H04B 13/00

[52] U.S. Cl. .................................... 340/10; 340/8 LF; 340/8 MM

[58] Field of Search ...................................... 340/8–13; 75/DIG. 1

[56] References Cited

U.S. PATENT DOCUMENTS

| | | | |
|---|---|---|---|
| 3,165,826 | 1/1965 | Bentov | 75/DIG. 1 |
| 3,231,341 | 6/1966 | Sump et al. | 75/DIG. 1 |
| 3,328,751 | 6/1967 | Massa | 340/10 |
| 3,474,403 | 10/1969 | Massa et al. | 340/10 |
| 3,480,906 | 11/1969 | Thompson | 340/8 R |
| 3,525,071 | 8/1970 | Massa, Jr. | 340/10 X |
| 3,539,980 | 11/1970 | Massa, Jr. | 340/8 PC |
| 3,550,071 | 12/1970 | Schlemm et al. | 340/10 X |
| 3,716,828 | 2/1973 | Massa | 340/10 |

OTHER PUBLICATIONS

Self Lubricating Plastics by G. Ronald Bower, Metal Progress, vol. 88, No. 3, Sept. 65.

*Primary Examiner*—Harold Tudor
*Attorney, Agent, or Firm*—Oblon, Fisher, Spivak, McClelland & Maier

[57] ABSTRACT

An improved-performance transducer for deep submersion operation.

An axially operating sandwich type transducer has its active part arranged in a housing designed and embodied to form a filter for decoupling the active face. Such a transducer is usable in systems for underwater acoustics.

5 Claims, 5 Drawing Figures

ELECTROACOUSTIC TRANSDUCER FOR DEEP SUBMERSION

BACKGROUND OF THE INVENTION

1. Field of the Invention

The present invention relates to electroacoustic transducers for deep submersion. It relates in particular to axial transmission and/or reception transducers intended to operate in a marine environment at considerable depth e.g. deeper than 4,000 metres. Because of hydrostatic pressure it is difficult to produce such transducers for use at these depths.

2. The Prior Art

Various techniques are known at the present time for producing electroacoustic transducers which will operate when deeply submerged.

It is possible, for example, to use a gas to pressurise the interior of a sealed enclosure containing the transducer, the latter thus becoming capable of use at greater depths.

It is also possible to have a transducer which is submerged just as it is in the water and to shape the counter mass and front mass which contains its active face in such a way as to obtain the desired energy ratio between front and rear; also exists a submerged transducers termed "free flooded". Unfortunately it is impossible to obtain a Q factor of better than 6, which is a disadvantage for wide frequency band operation.

The transducer may be enclosed in a sealed cavity which is resistant to outside pressure. For this however it is necessary to use large amounts of a material which is extremely resistant to the compression stresses involved and ceramics made of a piezoelectric material which is of a particularly high standard from the mechanical point of view.

The interior of such a cavity may be made to communicate with the surrounding medium by means of a capillary passage passing through its walls, but the efficiency of the transducer is reduced due to energy losses resulting from residual radial-mode vibration.

SUMMARY OF THE INVENTION

One object of the present invention is to provide an electroacoustic transducer for deep submersion which operates with longitudinal waves without having the disadvantages of known constructions which are mentioned above.

Briefly, in accordance with the invention an electroacoustic transducer for deep submersion comprises an electroacoustic transducer of the sandwich type which has a front mass provided with an active face, a countermass at the rear, and an active part, formed from piezoelectric wafers known as ceramics, which is arranged between the front and rear masses, and this transducer is combined with a means for decoupling the active face from the transducer as a whole and for embodying a housing which leaves the said active face virtually unenclosed.

In accordance with a feature of the present invention, an electroacoustic transducer for deep submersion which utilises an assembly of the sandwich type wherein the decoupling means comprises a housing which forms a mechanical filter for decoupling the active face, this housing being formed from members which are alternately of the compliant and inertial types and which close off the gap between the front and rear parts of the transducer and enclose its active part.

In accordance with another feature of the invention, the housing is internally shaped and filled with a fluid, thus producing a fluid acoustic filter which decouples the said active face.

In accordance with a further feature, the said housing is cylindrical.

BRIEF DESCRIPTION OF THE DRAWINGS

Other features and advantages of the transducer according to the invention will become apparent from the following description, which is given by way of example and is illustrated by the accompanying Figures, in which.

DETAILED DESCRIPTION OF THE ILLUSTRATED EMBODIMENTS

An important aspect of the invention is the use of a filter of a specific kind combined with a transducer. Thus, the chief element which is combined with the deep-submersion electroacoustic transducer which operates with longitudinal waves is formed by a mechanical filter, which may be cylindrical in shape, which acts as a housing for the active part of the transducer, and one end of which bears against that face of the front mass of the transducer which is opposite from the active face. The function of the mechanical filter is to keep the mechanical impedance, Zav, on this active face as low as possible, the filter being "closed" at its opposite end by a mechanical impedance, Zar, which in general is of high value.

Figure 1:
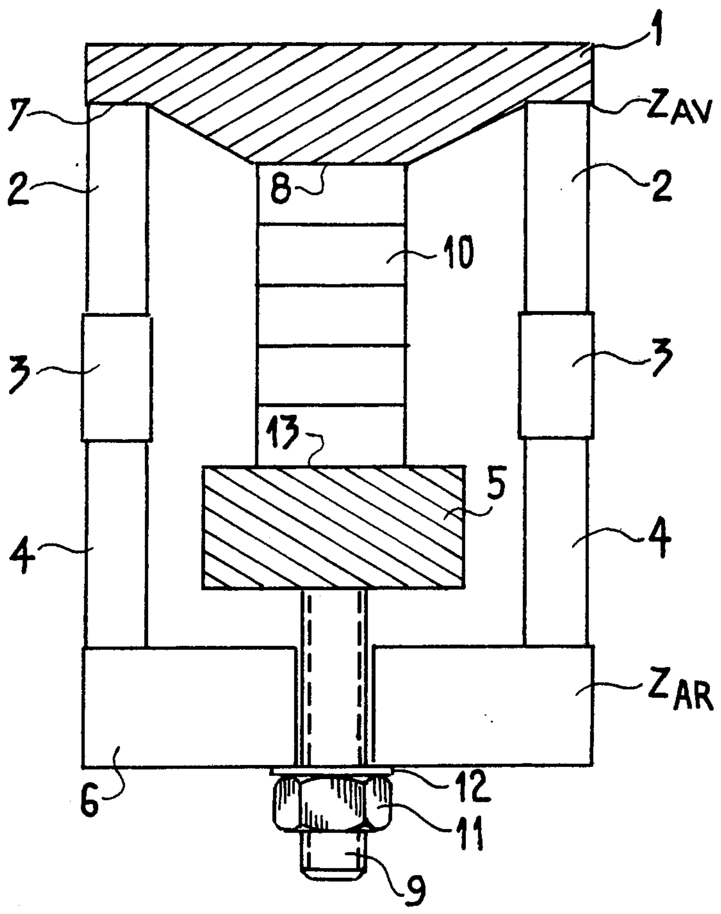
FIG. 1 : a cross-sectional view of the electroacoustic transducer according to the invention.

In FIG. 1 of the drawings from top to bottom, there can be seen first a front mass which has an active face 1. Around the periphery of the opposite face it has a bearing surface 7 and, in the centre, another surface 8 which is associated with an assembly rod 9. On this rod, between surface 8 and counter mass 5, are stacked the piezoelectric ceramics 10 forming the active part, and which are enclosed in hollow cylinders 2, 3 and 4. The cylinders are mounted between bearing surface 7 and one face of the rear mass 6, which latter forms a base. Rod 9 passes through the centre of the base and when tensioned by means of a nut 11 which acts through a washer 12 it pre-stresses the ceramics 10.

FIG. 1 shows a composite transducer of cylindrical shape which operates with longitudinal waves and is constructed as described. The mechanical filter proper is formed by the stack of hollow cylinders 2, 3, and 4, of which there are here only three but of which there could be more. The materials selected here are such that, at the operating frequency of the transducer, cylinders 2 and 4 behave as "compliances", similar to springs, while cylinder 3 behaves as an inertial mass.

The compliance $C_m$ of a material is defined as the relation between extension $\Delta$ 1 and the force F which causes it:

$$C_m = \frac{\Delta 1}{F} \quad (1)$$

The ratio between stress and the deformation produced corresponds, in the range over which Hooke's law applies, to the co-efficient of elasticity of a solid, and, for changes in length 1, may be defined by an equation involving Young's modulus E, namely:

$$\frac{\Delta 1}{1} = \frac{l}{E} \times \frac{F}{S} \quad (2)$$

with the various parameters of the equation being as defined above and S representing the cross-sectional area of the material.

It can therefore be said that $$C_m = \frac{l}{E} \times \frac{1}{S} \quad (3)$$

The main factors which are involved in combination in the operation of the proposed composite transducer are the resulting compliance $C_{mr}$ of the filter and the overall compliance $C_{mc}$ of the ceramics which form the active part.

The electrical analogue of a mechanical filter can be represented in a known way by using the following correspondences, assuming the analogy to be with voltage:

Compliance ⇄ Capacity

Inertia ⇄ Self induction

Figure 2:
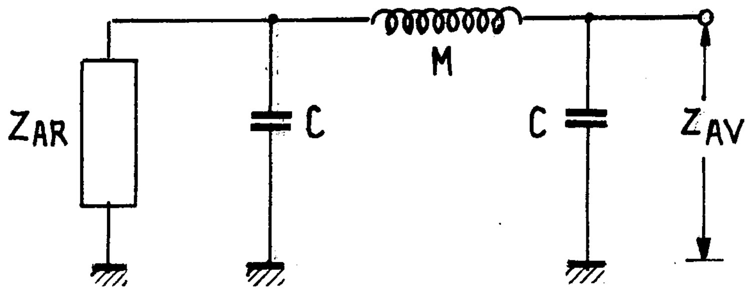
FIG. 2 is an equivalent electrical diagram for a mechanical filter as represented by the embodiment in FIG. 1.

The electrical diagram shown in FIG. 2 shows a $\pi$-structure filter and allows the behaviour of a three component unit to be explained, assuming that pure compliance and pure inertias are used, although in fact compliance C has some inertia and mass M has some compliance, which are ignored for the purposes of theoretical exposition.

The impedance Zav which is produced by such a filter is assumed to be closed by a virtually infinite impedance Zar, Zav may be expressed as:

$$\frac{l}{Zav} = jCw + \frac{l}{jMw + \frac{l}{jCw}} \quad (4)$$

in which $w$ represents angular velocity.

This means that:

$$\frac{l}{Zav} = jCw + \frac{jCw}{l - MCw^2} \quad (5)$$

$$\frac{l}{Zav} = jCw\left(1 + \frac{l}{l - MCw^2}\right)$$

$$\frac{l}{Zav} = jCw\left(\frac{2 - MCw^2}{l - MCw^2}\right)$$

and $$Zav = \frac{l}{Cw} \cdot \frac{l - MCw^2}{2 - MCw^2}$$

Figure 3:
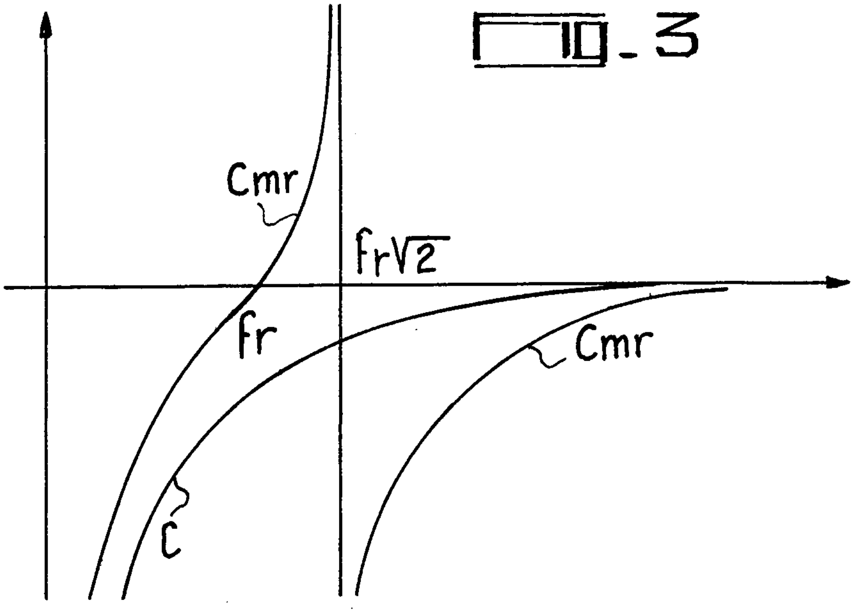
FIG. 3 is an explanatory diagram.

FIG. 3 represents the change in the reactance of impedance Zav, for a ring whose compliance is C and for the filter as a whole. The Figure shows the behaviour of Zav, which is capacitive or inductive depending upon the sign of its reactance which depends on the frequency $f = w/2\pi$.

It follows from this diagram that if a "pure" compliance, i.e., one of the capacity type is required, in view of the resonant frequency fr of the filter, it is necessary for the operating point to lie at the frequencies $\gg$ fr $\sqrt{2}$ at which the two $C_{mr}$ curves and curve C tend asymptotically towards zero.

Assuming $C_{mc}$ to represent the compliance of the ceramic, and $C_{mr}$ being the compliance of the filter, it can be shown that the relationship between the resonant frequency $fg$ of the filter and transducer assembly and the resonant frequency fo of the transducer alone may be expressed by the equation:

$$\frac{fg}{fo} = \sqrt{1 + \frac{1}{K}} \quad (6)$$

in which $$K = \frac{Cmr}{Cmc}$$

and is the ratio between the compliances of the filter and the ceramic.

In the operating region selected, and because curves $C_{mr}$ and C in FIG. 3 are asymptotic, $C_{mr}$ may be considered comparable to C and calculations may be based directly on compliance C, assuming that $$K \simeq \frac{C}{C_{mc}} \quad (7)$$

If this approximation is accepted, characteristics can be obtained which will make it possible to define the types of materials which can be used to produce the compliant parts of the mechanical filter as a function of the compliance of the ceramic and the dimensions of the transducer to be produced.

It can be shown that the above approximation holds good when the value of the ratio $fo/fr \geqq 2.5$, in which $fr$ is the natural resonant frequency of the mechanical filter.

Compliances C and $C_{mc}$ are therefore calculated as a function of geometrical and mechanical factors relating to the materials used. Thus, the compliance C of the compliant ring of the filter in question may be expressed as:

$$C = \frac{l}{E_m} \cdot \frac{1}{S_a} \quad (8)$$

in which

1 = the height of the ring, $S_a$ = the cross-sectional area of the ring, $E_m$ = the modulus of elasticity of the material employed.

In the case of the ceramic:

$$C_{mc} = \frac{l}{E} \cdot \frac{L_c}{S} \quad (9)$$

$L_c$ = the height of the ceramic,

S = the cross-section of the ceramic,

E = the modulus of elasticity of the material employed;

$$K = \frac{C}{C_{mc}} = \frac{E}{E_m}\ \frac{S}{S_a}\ \frac{1}{L_c};$$

If the area $S_0$ of the front face of the transducer is included and the following area ratios are defined:

$$ra = \frac{S_o}{S_a} \text{ and } rt\ \frac{S_o}{S}$$

the following is obtained:

$$K = \frac{E}{E_m}\ \frac{ra}{rt}\ \frac{1}{L_c}$$

for a given transducer $$\frac{E}{rt\ L_c}$$

is fixed. Thus K may be expressed as $$K = const. \times ra\frac{1}{E_m} \qquad (10)$$

In addition, the height 1 of the compliant material is fixed by the maximum operating frequency $f_{max}$ and it is necessary that:

$$1 = \frac{\lambda}{4} = \frac{\text{velocity of sound in the compliant material}}{4f_{max}}$$

For a compliant ring, the acoustical phase difference between the mechanical displacements at the extremities in compression or extension, needs to be $\pi/4$ at the maximum, whence:

$$K = \text{const.}\frac{ra\ va}{4f_{max}\,E_m}$$

in which *va* is the abovementioned velocity, and hence by identifying $4f_{max}$ with the constant:

$$K = \text{const.}\frac{ra}{\rho a\ va}$$

Since it is known that $E_m = \rho a.va^2$, in which $\rho a$ is the density of the material forming the compliant ring, it can be deduced that K will be large when the product of $\rho a.va$ is small, and thus the material is of low acoustic impedance, and for a value of ra which is high. It will be remembered that ra represents the ratio, So/Sa, between the area of the front face of the transducer and the cross-section of the compliant ring on which the said front face rests.

From the strength of the materials it is possible to estimate the tangential stress F*t* which is exerted on the compliant ring 2 or 4 as a result of the hydrostatic pressure Po, which is exerted uniformy over the transducer, i.e., $Ft \simeq ra.Po$.

This stress is exerted tangentially to the circular cross-section of the compliant ring. It tends to crush the ring. Thus, at a depth of 2,000 metres, a pressure of 200 bars produces a tangential stress of 1,200 bars when the ratio ra is 3.

The material of which the compliant rings are formed may, for example, have an anisotropic structure which enables it to have good compliance and relatively low resistance to axial compression but very high tangential resistance to cracking. A material of anisotropic structure is therefore used and this may be a material having a structure made up of tangential fibres of, for example:

filamented glass,
filamented graphite,
filamented boron.

The advantages of such structures vary depending upon the material which is used. Glass has a low modulus of elasticity and high mechanical strength. The characteristics of boron are the opposite of those of glass. As for graphite, it provides a satisfactory compromise and is used in a preferred embodiment of the transducer according to the invention. The binders used such as, for example, suitable epoxies, may give products for $\rho a.va$ of the order of 1.4 × 2,000. The cross-sectional ratios ra envisaged are of the order of 2. Finally, the ceramics employed are neither excessively compliant nor bulky.

Figure 5:
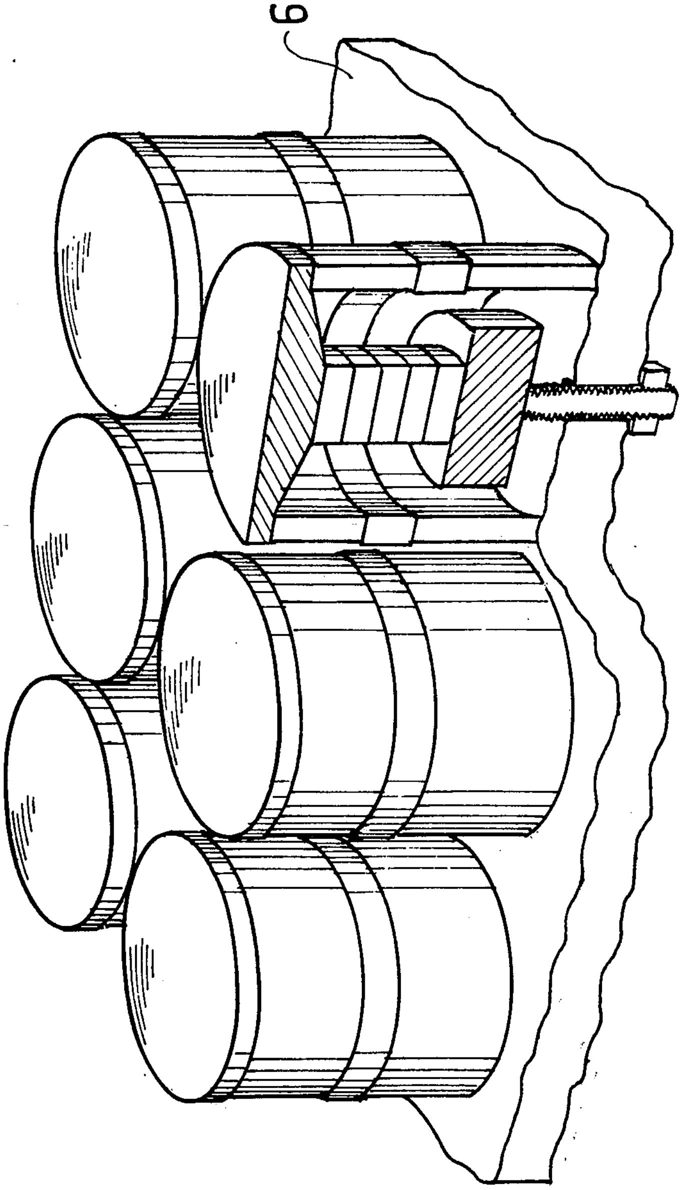
FIG. 5 is a perspective view, partly in section, of an embodiment featuring a plurality of transducers, according to the present invention, arranged on a common mounting base.

For a transducer according to the invention the ratio between emission levels at front and rear is a function of the mass of the filter 2, 3, 4 and of the mass of the base 6 of the transducer on which the lower part of the mechanical filter rests. For example, where the ratio between the masses is 0.5, the front/rear ratio obtained is 13 dB. A group of such transducers arranged on a common base, as shown in FIG. 5 will thus enjoy the benefits of a high front/rear ratio which will make possible advantageous radiation diagrams.

Figure 4:
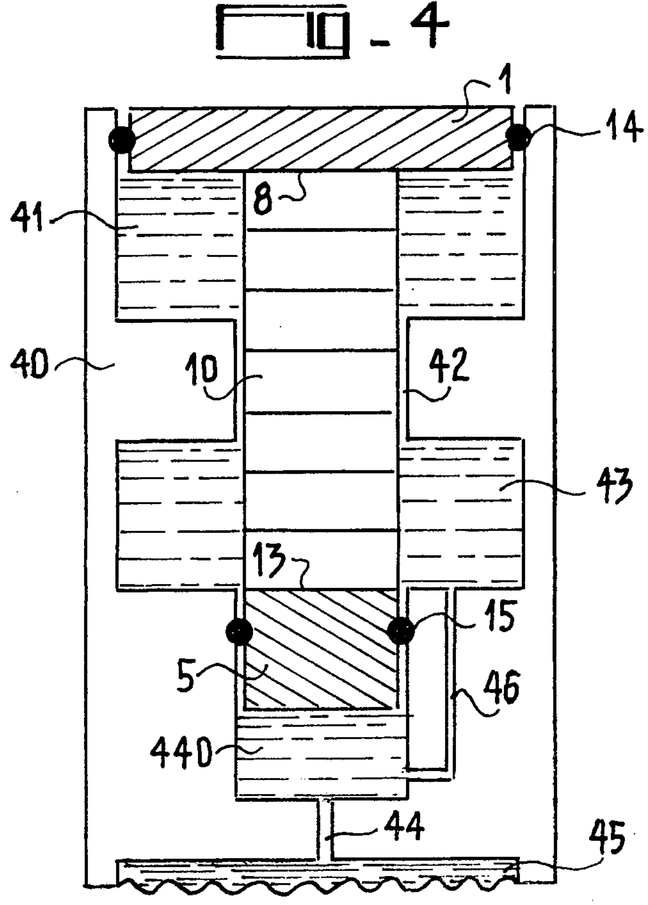
FIG. 4 is a cross-sectional view of a transducer according to the invention showing an embodiment incorporating a fluid filter.

What has just been said with specific reference to a mechanical filter is also applicable in the case of a fluid acoustic filter which is formed by a filling liquid, such as, for example, water, which equalises pressure between the inside and outside of the transducer, as shown in FIG. 4. In this Figure are once again found the parts of the composite transducer, namely, an active face 1, ceramics 10, a counter mass 5, and a housing 40.

This housing 40, which is advantageously cylindrical, has an interior formed by a first toroidal cavity 41 of rectangular cross-section, which, when the ceramics of the transducer are in position, communicates via a narrow annular passage 42 of very small cross-sectional area S with a second toroidal cavity 43 of rectangular cross-section.

This arrangement of cavity, passage, cavity is equivalent to a fluid acoustic filter in which cavities 41 and 43 act as two compliances the value of which can be calculated from the formula:

$$C = \frac{l}{\rho\, v^2}\ \frac{V}{S^2}$$

in which $\rho$ is the density of the filling liquid
$v$ is the velocity of sound in this liquid,
V is the volume of the cavity, and
S is the cross-section of annular passage 42.

It should also be mentioned that $\rho v^2$ is the isotropic modulus of compression of the liquid contained in the toroidal cavities 41 or 43.

The annular space 42 may be compared to an inertial mass meq value of which is calculated as follows:

$$meq = \rho \frac{l}{S}$$

in which $\rho$ is the density of the filling liquid, 1 is the height of the annular space 42, and S is the cross-section of this annular space.

What was said in the previous instance applies and the operation of the fluid filter is substantially similar to the operation of the mechanical filter. In both cases the active part contains electrical connections which are represented by numerals 8 and 13 on the Figures and which are connectable to associated apparatus.

0-ring joints 14, 15 seal the device between the active face 1, the counter mass 5, and the housing 40 forming the casing. Between these parts and the envelope of the transducer, an expansion chamber allows internal and external pressure to be equalised during submerged operation. The expansion chamber 45 is connected by a capillary tube 44 to a fluid-filled cavity 440 situated between the counter-mass 5 and the housing 40 of the transducer. A by-pass passage 46 provides communication between the interior (43, 42, 41) of the transducer and cavity 440.

The deep submersion transducer so produced is chiefly applicable to underwater acoustics.

Of course, the invention is not limited to the embodiment described and shown which was given solely by way of example.

What is claimed as new and desired to be secured by Letters Patent of the United States is:

1. An axial electroacoustic transducer, for deep submergence and which operates in a longitudinal wave mode, is of the sandwich type comprising:

a member having an active front radiating face;

a counter-mass disposed rearwardly of said member; and an active part, provided with front and rear electrical connections (8, 13) and which is formed by means of a plurality of coaxially stacked piezoelectric wafers, arranged between said member and said rear counter-mass, said active part and said rear counter-mass are enclosed in a cylindrical housing one base of which is formed by said active radiating face while the other base of which comprises an inertia loading mass (6) and the side of which is formed by decoupling means operatively associated with said active radiating face (1) and said inertia loading mass, such that the decoupling properties are maintained even for high pressure operations whereby the electroacoustic transducer thus obtained is able to operate over a wide frequency band, said decoupling means also forming an acoustic filter formed by means of axially stacked annular members, at least three in number, alternately of a compliant type and of an inertial type within the operating frequency range, whereby the resultant properties include high compliance, in the axial direction of the decoupling means, and high resistance, in both the radial and tangential directions, to compression of the decoupling means.

2. A transducer as set forth in claim 1, wherein:

said compliant members are toroidal in configuration and are formed from fibers of a filamented material which is embedded in a binder so as to form a mechanical filter.

3. A transducer according to claim 1, wherein:

the ratio ($r_a$) between the areas of the front face of the transducer ($S_o$) and the cross-section of the torus ($S_a$) is approximately 2; and the product between the density of the binder and the velocity of sound in it, gives a small value on the order of 2,800.

4. A transducer according to claim 1, wherein:

said decoupling means is a fluid acoustic filter defined within said cylindrical housing (40) by dividing the inside of said housing into at least three cavities (41, 42, 43) whose dimensions are alternately comparable to and small in comparison with those of the piezoelectric wafers (10) which form the active part of the transducer, said cavities being, respectively, rectangular, annular and rectangular in cross-section and being peripherally disposed longitudinally about said plurality of stacked wafers, and being filled with a liquid of which the velocity of sound, and the density, are fixed and which cavities act as compliances when they are of comparable dimensions to said wafers and as inertial masses when they are of comparatively small dimensions.

5. A transducer as set forth in claim 1, further comprising:

a plurality of transducers wherein said rear mass (6) forms a common mounting base for said transducers, the said assembly having a high front-rear ratio.

* * * * *

UNITED STATES PATENT AND TRADEMARK OFFICE

CERTIFICATE OF CORRECTION

PATENT NO. : 4,068,209

DATED : January 10, 1978

INVENTOR(S) : Lagier

It is certified that error appears in the above-identified patent and that said Letters Patent are hereby corrected as shown below:

Column 3, line 64, please delete "$Zav = \frac{j}{Cw} \quad \frac{1-MCw^2}{2-MCw^2}$"

and insert therefor --$Zav = \frac{-j}{Cw} \quad \frac{1-MCw^2}{2-MCw^2}$--; and Column 5, line 10, please delete "rt $\frac{So}{S}$" and insert therefore --$rt = \frac{So}{S}$--.

Signed and Sealed this

*Twenty-ninth* Day of *August 1978*

[SEAL]

*Attest:*

RUTH C. MASON
*Attesting Officer*

DONALD W. BANNER
*Commissioner of Patents and Trademarks*